US009160128B2

(12) United States Patent
Chadbourne et al.

(10) Patent No.: US 9,160,128 B2
(45) Date of Patent: Oct. 13, 2015

(54) WEDGE CONNECTOR INSTALLATION TOOL

(75) Inventors: Christopher G. Chadbourne, Nashua, NH (US); Bernard C. Crutcher, Londonderry, NH (US); Armand T. Montminy, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 1100 days.

(21) Appl. No.: 12/074,587

(22) Filed: Mar. 4, 2008

(65) Prior Publication Data

US 2009/0223042 A1 Sep. 10, 2009

(51) Int. Cl.

| | |
|---|---|
| ***B23P 19/00*** | (2006.01) |
| ***H01R 43/00*** | (2006.01) |
| ***H01R 43/027*** | (2006.01) |
| ***H01R 4/50*** | (2006.01) |
| ***H01R 43/04*** | (2006.01) |

(52) U.S. Cl.

CPC ............ *H01R 43/027* (2013.01); *H01R 4/5083* (2013.01); *H01R 43/04* (2013.01); *Y10T 29/53222* (2015.01); *Y10T 29/53257* (2015.01)

(58) Field of Classification Search

CPC .... H01R 43/027; H01R 43/04; H01R 4/5083; Y10T 29/53222; Y10T 29/53257

USPC ............ 29/750, 758, 857, 868, 872; 140/111, 140/113, 117; 7/107, 170; 30/120.2; D8/72, D8/73, 74

See application file for complete search history.

(56) References Cited

U.S. PATENT DOCUMENTS

| | | | | |
|---|---|---|---|---|
| 1,094,698 | A * | 4/1914 | Bostrom | 30/120.2 |
| 1,352,647 | A * | 9/1920 | Benton | 269/64 |
| 3,042,067 | A * | 7/1962 | Hidding | 137/315.07 |
| 3,212,534 | A * | 10/1965 | Broske | 140/113 |
| 3,292,363 | A * | 12/1966 | Wahl | 60/632 |
| 4,513,955 | A * | 4/1985 | Daubon | 269/41 |
| RE33,098 | E | 10/1989 | Center | 60/635 |
| 5,337,566 | A | 8/1994 | Lomastro et al. | 60/632 |
| 5,340,335 | A | 8/1994 | Haun | 439/783 |
| 5,493,975 | A | 2/1996 | Franzini et al. | 102/531 |
| 5,533,254 | A * | 7/1996 | Gallo et al. | 29/750 |
| 6,895,663 | B2 * | 5/2005 | Itrich | 29/750 |
| 2004/0177495 | A1 * | 9/2004 | Itrich | 29/754 |
| 2006/0084327 | A1 | 4/2006 | Chadbourne | 439/784 |
| 2007/0240301 | A1 | 10/2007 | Johnson et al. | 29/748 |

FOREIGN PATENT DOCUMENTS

| | | | | |
|---|---|---|---|---|
| JP | 2007-232103 | * | 9/2007 | F16B 2/12 |

OTHER PUBLICATIONS

Product Brochure, "REC-MDT Battery Powered Hydraulic Tool", Huskie Tool, Tyco Electronics, 1 pg.

* cited by examiner

*Primary Examiner* — Peter DungBa Vo
*Assistant Examiner* — Jeffrey T Carley
(74) *Attorney, Agent, or Firm* — Harrington & Smith

(57) ABSTRACT

An electrical connector installation tool including a frame and a screw ram. The frame includes a front end having an anvil section adapted to contact a front end of an electrical wedge connector shell, and a rear end having a threaded aperture. The screw ram has a front end, a rear end and a middle section. The front end is adapted to contact a rear end of an electrical wedge connector wedge. The middle section includes a threaded section which is connected to the threaded aperture of the frame to allow the screw ram to be screwed into the frame and thereby move the front end of the screw ram towards the anvil section.

9 Claims, 3 Drawing Sheets

WEDGE CONNECTOR INSTALLATION TOOL

BACKGROUND OF THE INVENTION

1. Field of the Invention

The invention relates to a tool for connecting an electrical wedge connector to conductors.

2. Brief Description of Prior Developments

Electrical wedge connectors are well known in the art. One type of tool used to install an electrical wedge connector onto conductors is an installation tool which uses a powder cartridge. An example of one such tool is described in U.S. Pat. No. Re. 33,098 which is hereby incorporated by reference in its entirety.

Wedge installed connectors such as WEJTAP™ or AMPACT™ use a power booster cartridge to propel a ram to push the wedge into place. However, there is difficulty in transporting fire-arm type material across borders. There is a desire to provide an installation tool which can be used with wedge connectors, but which does not require a power booster cartridge.

SUMMARY OF THE INVENTION

In accordance with one aspect of the invention, an electrical connector installation tool is provided including a frame and a screw ram. The frame includes a front end having an anvil section adapted to contact a front end of an electrical wedge connector shell, and a rear end having a threaded aperture. The screw ram has a front end, a rear end and a middle section. The front end is adapted to contact a rear end of an electrical wedge connector wedge. The middle section includes a threaded section which is connected to the threaded aperture of the frame to allow the screw ram to be screwed into the frame and thereby move the front end of the screw ram towards the anvil section.

In accordance with another aspect of the invention, an electrical connector installation tool is provided comprising a frame and a screw ram. The frame comprises a front end having an anvil section adapted to contact a front end of an electrical wedge connector shell, and a rear end having a threaded aperture. The screw ram has a front end, a rear end and a middle section. The front end is adapted to contact a rear end of an electrical wedge connector wedge. The rear end is sized and shaped to connect to a hydraulic impact wrench for axial rotation of the screw ram by the hydraulic impact wrench. The middle section comprises a threaded section which is connected to the threaded aperture of the frame to allow the screw ram to be screwed into the frame and thereby move the front end of the screw ram towards the anvil section.

In accordance with another aspect of the invention, an electrical connector installation tool is provided comprising a frame and a screw ram. The frame comprises a front end having an anvil section adapted to contact a front end of an electrical wedge connector shell, and a rear end having a threaded aperture. The screw ram has a front end, a rear end and a middle section. The front end has a general ball shape and is adapted to contact a rear end of an electrical wedge connector wedge. The rear end has a general cross sectional polygon shape which is sized and shaped to connect to a hydraulic impact wrench for axial rotation of the screw ram by the hydraulic impact wrench. The middle section comprises a threaded section which is connected to the threaded aperture of the frame to allow the screw ram to be screwed into the frame and thereby move the front end of the screw ram towards the anvil section. The rear end of the frame comprises a section adapted to contact the hydraulic impact wrench, when the hydraulic impact wrench is attached to the rear end of the screw ram, to prevent the frame from rotating while the screw ram is rotated by the hydraulic impact wrench.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
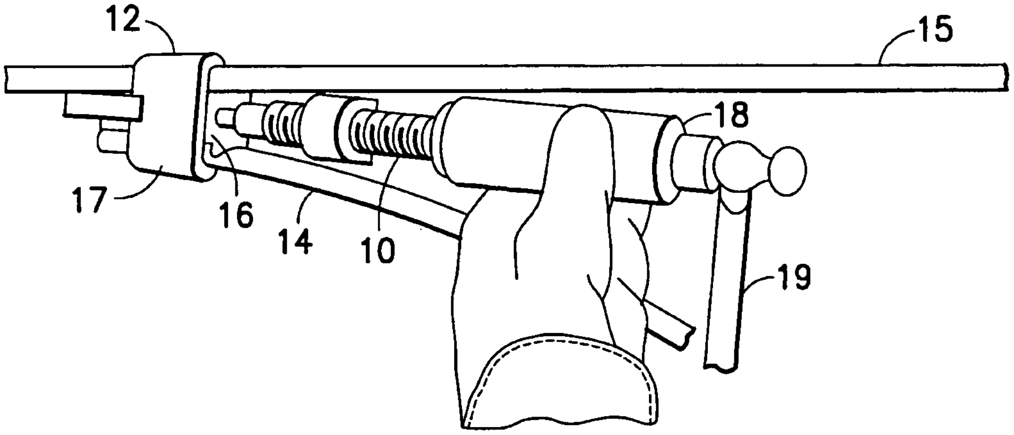
FIG.1 PRIOR ART
FIG. 1 is a perspective view showing a conventional tool in use for installing an electrical connector.

Referring to FIG. 1, there is shown a perspective view of a conventional electrical wedge connector installation tool 10 being used to install an electrical connector 12. The tool 10 is used for connecting a branch or tap wire 14 to a main powder line 15. The connector 12 includes a wedge 16 and a C-shaped sleeve or shell 17. The tool 10 uses a powder cartridge to drive the wedge 16 into the sleeve 17; sandwiching the wire 14 and line 15 against opposite ends of the sleeve 17. The tool is fired by a user striking the rear end 18 of the tool 10 with a hand-held hammer 19.

Figure 2:
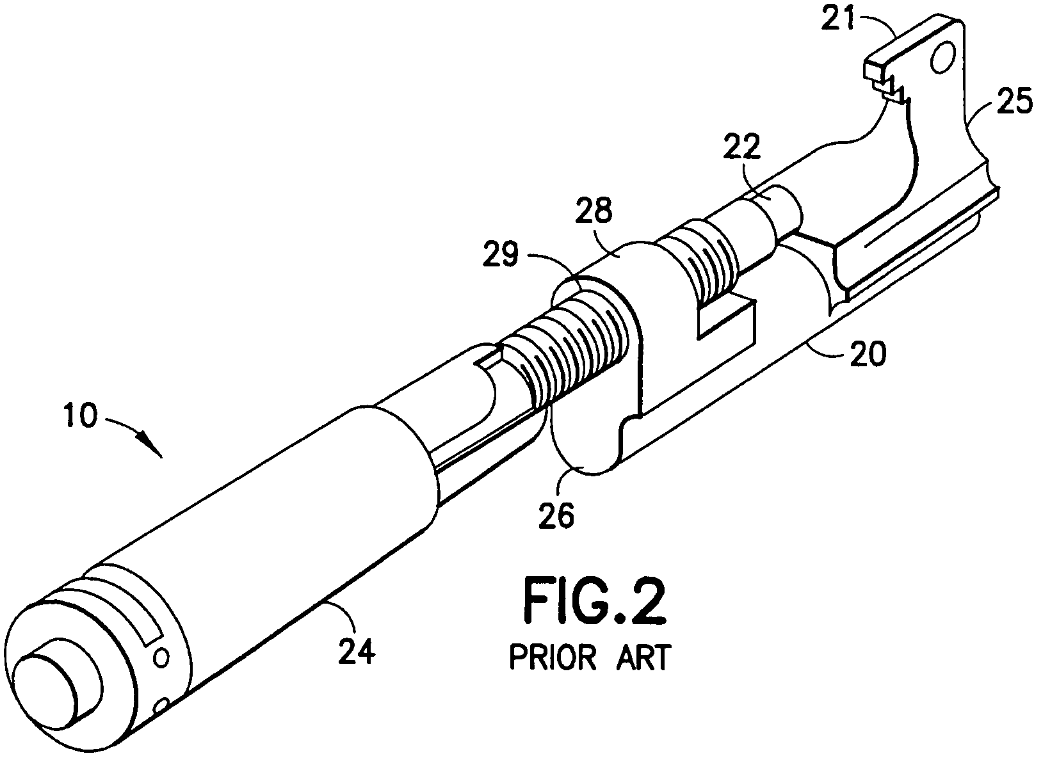
FIG.2 PRIOR ART
FIG. 2 is a perspective view of the connecting tool shown in FIG. 1.

Referring also to FIG. 2, there is shown an enlarged perspective view of the tool 10. The tool 10 is a hammer initiated powder actuated connecting tool. The tool 10 includes a frame 20 and a tool body 24. The frame 20 comprises a front end 25 forming an anvil section 21, and a rear end 26 forming a support sleeve 28. The support sleeve 28 comprises a threaded aperture 29 therethrough. The tool body 24 is screwed into the threaded aperture of the support sleeve 28 to position the powder ram 22 along the longitudinal axis of the tool. The tool body 24 received the firing cartridge. The tool body 24 comprises the ram 22 which is adapted to push against the wedge 1.6 to wedge the two cables 14, 15 into the shell 17 with the explosively powdered ram driving the wedge into its final position.

Figure 3:
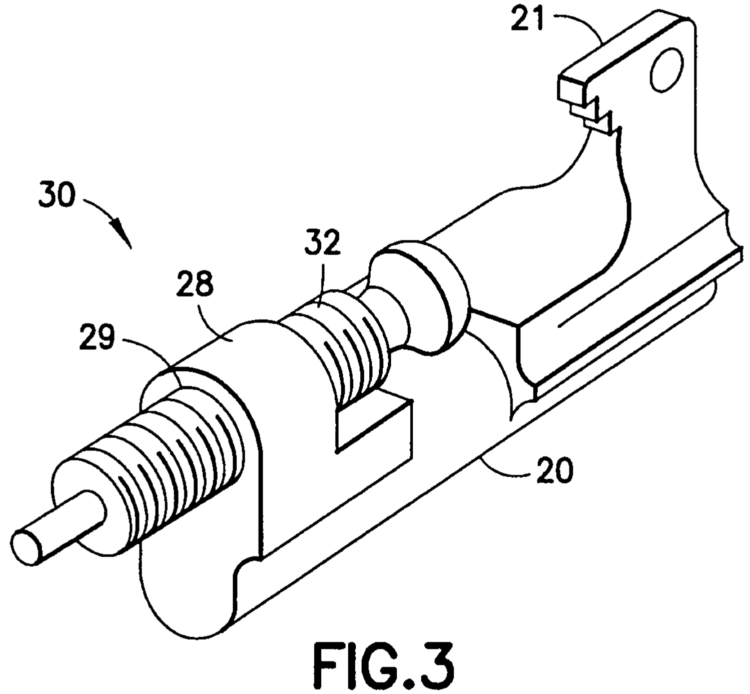
FIG. 3 is a perspective view of an electrical connector installation tool incorporating features of the invention.

Referring also to FIG. 3, there is shown a perspective view of an electrical connector installation tool 30 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 4:
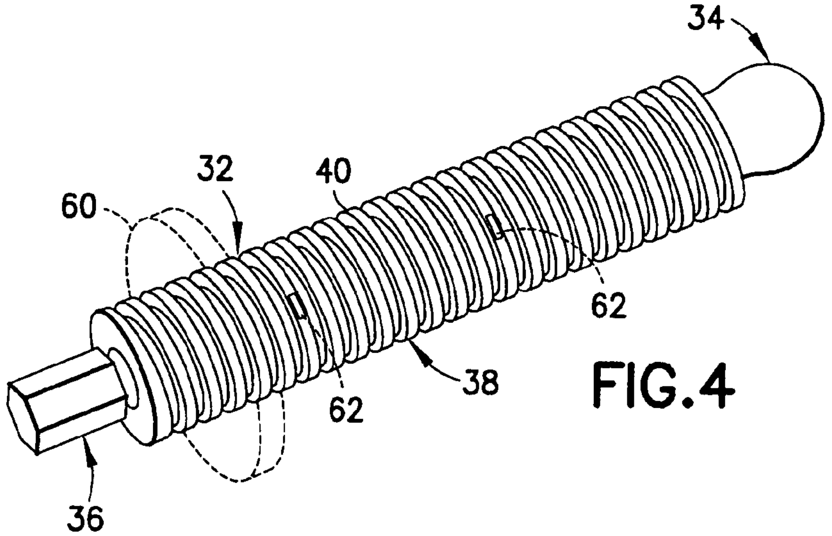
FIG. 4 is a perspective view of the screw ram of the tool shown in FIG. 3.

The tool 30 generally comprises the frame 20 and an adaptor or screw ram 32. The frame 20 is the same as the frame shown in FIGS. 1-2. However, the screw ram 32 is used to replace the tool body 24 to adapt the new tool 30 for use other than with a fired cartridge. Referring also to FIG. 4, the screw ram 32 generally comprises a front end 34, a rear end 36 and a middle section 38. In a preferred embodiment the screw ram is a one piece metal member. The front end 34 forms a general round, spherical or ball shaped tip. The rear end 36 has a general keying shape. In this embodiment the keying shape is a cross sectional hexagon shape. However, any suitable keying shape could be provided. The keying shape is adapted to allow a power tool to be removably attached to the rear end 36, such as a hydraulic impact wrench for example.

The middle section 38 has screw threads 40. The middle section 38 is screwed into the threaded aperture 29 of the support sleeve 28 such that the front end 34 faces towards the anvil section 21. When the screw ram 32 is axially rotated, the threaded engagement of the threads 40 in the threaded aperture 29 causes the screw ram 32 to longitudinally move on the support sleeve 28. Clockwise rotation of the screw ram causes the front end 34 to move towards the anvil section 21. Counterclockwise rotation of the screw ram causes the front end 34 to move away from the anvil section 21.

This adapter allows for installation of wedge installed connectors, such as WEJTAP™ or AMPACT™ without the use of a power booster cartridge to move the ram; to thereby push the wedge 16 into place in the shell 17. It also adapts to currently available frames, such as the BURNDY® red/blue or yellow WEJTAP™ frames. The hex shaped rear end allows for the adaptation of a hydraulic impact wrench which provides high torque rotational power to the unit, driving the adapter rotationally. The threads 40, engaged with the frame 20, drive the adapter 32 forward; propelling the wedge 16 into c-body shell 17 of the connector in a relatively short period of time. Although this is multiples of time longer than the current power booster installation time, it still overcomes the problems noted above with regard to shipping the tool to customers.

The benefits of this invention are that the user no longer needs to rely on a cartridge power booster to create the energy necessary to install the wedge of a wedge style connector into its mating c-body. Plus, the adapter 32 can be used with existing frames and existing hydraulic impact wrenches. This makes it easy to integrate into everyday operations without the need for additional special tooling.

Given the difficulty in transporting fire-arm type material across borders, this also facilitates the specification of wedge type connectors and this type of tool (including wrenches and frames) to foreign markets without the concern and hassle inherent in the transport of fire-arm type products.

The screw ram 32 can be provided with an optional limiter 60. The limiter 60 is movably mounted on the threads 40 of the screw ram 32. The limiter 60 can contact the rear end of the support sleeve 28 to limit the forward movement of the screw ram 32 on the support sleeve 28. The longitudinal position of the limiter 60 on the length of the screw ram 32 can be varied or adjusted by rotating the limiter 60 in the threads 40. The limiter can be a collar which could be installed to limit travel of the drive screw based upon pre-defined travel requirements for a given connector/conductor combination. Thus, the middle section 38 of the screw ram 32 could comprises indicium 62 to indicate the pre-defined travel requirements for one or more given connector/conductor combination(s). The spherical front tip of the screw ram 32 can limit contact between the tip of the drive screw and the driven wedge. This can minimize friction, and maximize rotational and linear motion of the drive screw. However, any suitable shape to push on the rear end of the wedge while the screw ram is rotated could be provided.

Figure 5:
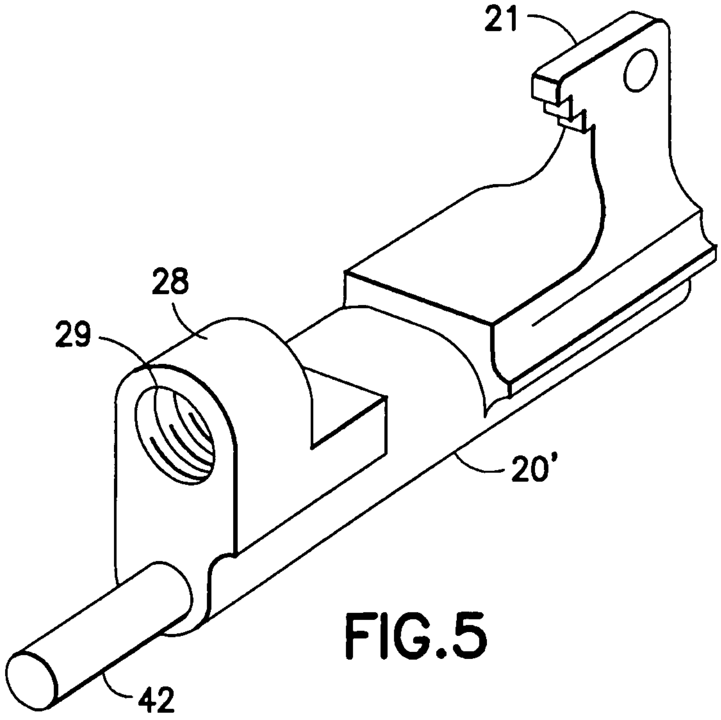
FIG. 5 is a perspective view of an alternate embodiment of frame shown in FIG. 3.

Referring also to FIG. 5, there is shown an alternate embodiment of the frame 20' for use with the screw ram 32. In this embodiment the frame 20' is identical to the frame 20 except that the frame 20' comprises a portion 42 which is adapted to engage a frame of the power tool to prevent the frame 20' from axially rotating relative to the frame of the power tool while the screw ram 32 is being axially rotated by the drive of the power tool. However, in alternate embodiments, any suitable means for preventing the frame of the electrical connector installation tool from axially rotating relative to the frame of the power tool could be provided.

Figure 6:
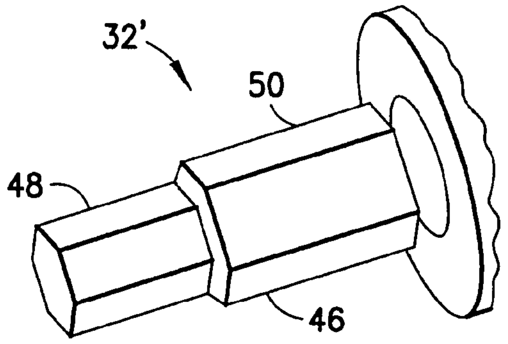
FIG. 6 is an enlarged perspective view of a rear end of an alternate embodiment of the screw ram shown in FIG. 4.

Referring also to FIG. 6, an enlarged perspective view of the rear end 46 of an alternate embodiment of the screw ram 32' is shown. In this embodiment the rear end 46 comprises two keying sections 48, 50 having different sizes. Each keying section has a general polygon shape. More specifically, each keying section has a general hexagon shape, but with different sizes. Thus, the rear end comprises at least two different size, stepped general cross sectional polygon shapes. This allows power tools with different size hex sockets to be attached to the rear end 46 to drive the screw ram 32'. However, in alternate embodiments, more than two keying sections could be provided, and/or the keying sections could have different shapes relative to each other.

Figure 7:
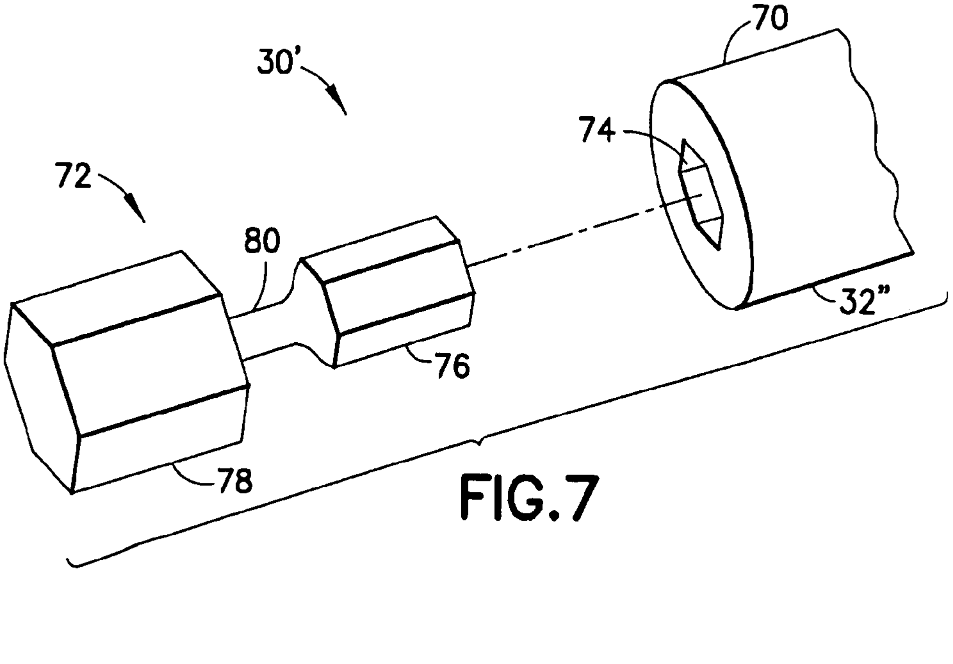
FIG. 7 is a partial perspective view of an alternate embodiment of the invention.

Referring also to FIG. 7, another embodiment of the invention is shown. In this embodiment the tool 30' is identical to the tool 30 except for the rear end 70 of the screw ram 32" and the addition of a shear connector member 72. The rear end 70 of the screw ram comprises an aperture 74. The aperture 74 has a general keyed shape. In this embodiment the aperture 74 has a hexagon shape. However, any suitable keyed shape could be provided.

The shear connector member 72 has a first end 76, an opposite second end 78, and a middle section 80. The first end 76 is sized and shaped to removably fit into the aperture 74 and form a keyed connection with the rear end 70 of the screw ram 32". This keyed connection allows the connector member 72 to axially rotate the screw ram 32" when the connector member 72 is axially rotated. The second end 78 is sized and shaped to be removably received in a working head of a power tool, such as a hydraulic impact wrench. The middle section 80 is sized and shaped to form a shear pin section. More specifically, when enough torque is applied the middle section can shear or break to separate the second end 78 from the first end 76.

In use, a user of the tool 30' would insert the first end 76 into the aperture 74 and insert the second end 78 into the power tool. The user would then operate the power tool to axially rotate the connector member 72 and the screw ram 32" together. The screw ram 32" would longitudinally advance in the frame 20 with its front end 34 pushing the wedge 16 into the shell 17. When a predetermined torque is reached on the shear connector member 72 the middle section 80 will break. Thus, forward advancement of the wedge 16 into the shell 17 will automatically stop at a predetermined pressure.

After installation of the wedge into the shell, the used connector member 72 can be removed from the screw ram 32" and power tool, and discarded. A new shear connector member can then be used for a subsequent new connection. One advantage with this type of system it that different shear connector members can be used with different size wedges and shells. Each different shear connector member could be adapted to shear or break at a different torque or wedge installation pressure.

With this type of alternate embodiment, a female hex or polygon shape can be made internal to the drive screw which could accept color-coded hex or polygonal inserts that would be sized and shaped to shear off at specific installation torques. These specific installation torques could match the installation torque requirements of specifically sized or color-coded wedge connectors. As an example, it is envisioned that a 'blue' anodized hexagonal shaped 'shear pin' be inserted into the drive adapter when the user is installing a 'blue' color coded connector, which would couple with the impact wrench, and drive the adapter forward until it reached a given installation torque, then shear off to complete the connection. The two pieces from the shear pin can then be removed from the tool and the drive adapter respectively. The color coding allows users to indicate which pin to use with which connector size; allowing the drive adapter to be re-used with new shear pins as frequently as required. The pre-defined shearing prevents over-torque, and also implies a safety means for the installer to prevent potentially harmful tool or frame rotation upon completion of the installation.

It should be understood that the foregoing description is only illustrative of the invention. Various alternatives and modifications can be devised by those skilled in the art without departing from the invention. For example, features recited in the various dependent claims could be combined with each other in any suitable combination(s). Accordingly, the invention is intended to embrace all such alternatives, modifications and variances which fall within the scope of the appended claims.

What is claimed is:

1. A one-piece electrical connector installation tool screw ram comprising:

a front end which is closed and is adapted to contact a rear end of an electrical wedge connector wedge;

a rear end which is sized and shaped to connect to a hydraulic impact wrench for axial rotation of the screw ram by a hydraulic impact wrench; and a middle section comprising a threaded section which is adapted to be directly connected to a threaded aperture of an electrical connector installation tool frame to allow the screw ram to be screwed into the frame and thereby move the front end of the screw ram towards an anvil section of the frame, where the screw ram is configured such that, when the screw ram is screwed into the frame with an electrical wedge connector shell located against the anvil section of the frame and the wedge against the front end, the front end pushes the wedge towards the anvil section into the shell and connects electrical conductors to each other by wedging the wedge into the shell.

2. An electrical connector installation tool comprising:

a frame comprising a front end having an anvil section adapted to contact a front end of an electrical wedge connector shell, and a rear end having a threaded aperture; and a screw ram as in claim 1 connected to the threaded aperture.

3. An electrical connector installation tool screw ram as in claim 1 wherein the front end of the screw ram comprises a rounded shape.

4. An electrical connector installation tool screw ram as in claim 1 wherein the front end of the screw ram comprises a ball shape.

5. An electrical connector installation tool screw ram as in claim 1 wherein the rear end has a substantially cross sectional polygon shape.

6. An electrical connector installation tool screw ram as in claim 1 wherein the rear end has a substantially cross sectional hexagon shape.

7. An electrical connector installation tool screw ram as in claim 1 wherein the rear end comprises at least two different size, stepped substantially cross sectional polygon shapes.

8. An electrical connector installation tool screw ram as in claim 1 further comprising a travel limiter collar movably located on the threaded section.

9. An electrical connector installation tool as in claim 2 wherein the rear end of the frame comprises a section adapted to contact a power tool, which is attached to the rear end of the screw ram, to prevent the frame from rotating while the screw ram is rotated by the power tool.

* * * * *